(12) United States Patent  
Gardner et al.

(10) Patent No.: US 8,874,527 B2  
(45) Date of Patent: Oct. 28, 2014

(54) LOCAL SEEDING OF A RESTORE STORAGE FOR RESTORING A BACKUP FROM A REMOTE DEDUPLICATION VAULT STORAGE

(71) Applicant: Storagecraft Technology Corporation, Draper, UT (US)

(72) Inventors: Andrew Lynn Gardner, Salt Lake City, UT (US); Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 29 days.

(21) Appl. No.: 13/782,957

(22) Filed: Mar. 1, 2013

(65) Prior Publication Data

US 2014/0250079 A1 Sep. 4, 2014

(51) Int. Cl.  
*G06F 17/30* (2006.01)  
*G06F 11/14* (2006.01)

(52) U.S. Cl.  
CPC ................ *G06F 11/1453* (2013.01)  
USPC ............ 707/679; 707/646; 707/640

(58) Field of Classification Search  
CPC .......... G06F 11/1453; G06F 3/0641; G06F 11/1469; G06F 17/30091  
USPC .................. 707/646, 640, 679  
See application file for complete search history.

(56) References Cited

U.S. PATENT DOCUMENTS

| | | | |
|---|---|---|---|
| 4,853,843 A | 8/1989 | Ecklund | |
| 5,623,608 A | 4/1997 | Ng | |
| 5,765,173 A | 6/1998 | Cane et al. | |
| 5,778,430 A | 7/1998 | Ish et al. | |
| 5,991,858 A * | 11/1999 | Weinlander | 711/163 |
| 6,148,412 A | 11/2000 | Cannon et al. | |
| 6,760,840 B1 | 7/2004 | Shimbo et al. | |
| 6,912,629 B1 * | 6/2005 | West et al. | 711/161 |
| 7,330,997 B1 | 2/2008 | Odom | |
| 7,337,286 B1 * | 2/2008 | West et al. | 711/161 |
| 7,447,854 B1 | 11/2008 | Cannon | |
| 7,529,785 B1 | 5/2009 | Spertus et al. | |
| 7,653,668 B1 | 1/2010 | Shelat et al. | |
| 7,783,600 B1 | 8/2010 | Spertus et al. | |
| 7,865,475 B1 * | 1/2011 | Yadav et al. | 707/655 |

(Continued)

OTHER PUBLICATIONS

U.S. Appl. No. 13/782,986, filed Mar. 1, 2013, tiled "Defragmentation During Multiphase Deduplication".

(Continued)

*Primary Examiner* — Thanh-Ha Dang  
(74) *Attorney, Agent, or Firm* — Maschoff Brennan (57) ABSTRACT

Local seeding of a restore storage for restoring a backup from a remote deduplication vault storage. In one example embodiment, a method of local seeding of a restore storage for restoring a backup from a remote deduplication vault storage includes determining which blocks included in a backup of a source storage at a point in time, which is stored in the remote vault storage, are available in a local seeded storage containing common blocks, reading the locally available blocks from the local seeded storage, reading the non-locally available blocks from the remote vault storage, and storing the read blocks in the restore storage in the same position as stored in the source storage at the point in time. The remote vault storage is remote from the restore storage and the local seeded storage is local to the restore storage.

19 Claims, 4 Drawing Sheets

(56) References Cited

U.S. PATENT DOCUMENTS

| | | |
|---|---|---|
| 7,873,601 B1 | 1/2011 | Kushwah |
| 7,925,623 B2 | 4/2011 | Therrien et al. |
| 7,962,452 B2 | 6/2011 | Anglin |
| 8,037,032 B2 | 10/2011 | Pershin et al. |
| 8,041,677 B2 | 10/2011 | Sumner et al. |
| 8,046,329 B2* | 10/2011 | Shah et al. .................... 707/624 |
| 8,055,613 B1 | 11/2011 | Mu et al. |
| 8,086,569 B2* | 12/2011 | Jasrasaria .................... 707/625 |
| 8,099,572 B1 | 1/2012 | Arora et al. |
| 8,117,410 B2* | 2/2012 | Lu et al. ........................ 711/162 |
| 8,131,924 B1 | 3/2012 | Frandzel et al. |
| 8,190,836 B1 | 5/2012 | Zheng et al. |
| 8,281,099 B2 | 10/2012 | Kishi |
| 8,285,681 B2 | 10/2012 | Prahlad et al. |
| 8,335,770 B2* | 12/2012 | Merchant et al. ............. 707/682 |
| 8,364,641 B2 | 1/2013 | Hirsch |
| 8,380,678 B2 | 2/2013 | Manson |
| 8,407,186 B1 | 3/2013 | Cremelie et al. |
| 8,682,870 B1 | 3/2014 | Gardner |
| 8,726,242 B2* | 5/2014 | Ngo .............................. 717/127 |
| 8,732,135 B1* | 5/2014 | Gardner ......................... 707/679 |
| 8,738,577 B1* | 5/2014 | Gardner ......................... 707/640 |
| 8,751,454 B1* | 6/2014 | Bushman et al. .............. 707/640 |
| 2002/0073276 A1 | 6/2002 | Howard et al. |
| 2003/0105810 A1 | 6/2003 | McCrory et al. |
| 2003/0204609 A1 | 10/2003 | Anderson et al. |
| 2004/0267836 A1 | 12/2004 | Armangau et al. |
| 2005/0216665 A1 | 9/2005 | Takakuwa |
| 2005/0240813 A1 | 10/2005 | Okada et al. |
| 2006/0064416 A1 | 3/2006 | Sim-Tang |
| 2006/0173935 A1* | 8/2006 | Merchant et al. ............. 707/204 |
| 2007/0100913 A1 | 5/2007 | Sumner et al. |
| 2007/0136200 A1 | 6/2007 | Frank et al. |
| 2008/0005141 A1 | 1/2008 | Zheng et al. |
| 2008/0184001 A1 | 7/2008 | Stager |
| 2008/0208933 A1 | 8/2008 | Lyon |
| 2008/0235306 A1 | 9/2008 | Kim et al. |
| 2008/0244204 A1* | 10/2008 | Cremelie et al. .............. 711/162 |
| 2008/0307347 A1 | 12/2008 | Cisler et al. |
| 2009/0164529 A1 | 6/2009 | McCain |
| 2009/0204649 A1 | 8/2009 | Wong et al. |
| 2009/0204765 A1 | 8/2009 | Gupta et al. |
| 2009/0254507 A1 | 10/2009 | Hosoya et al. |
| 2009/0327362 A1* | 12/2009 | Shah et al. .................... 707/204 |
| 2010/0076934 A1 | 3/2010 | Pershin et al. |
| 2010/0191748 A1 | 7/2010 | Martin et al. |
| 2010/0257142 A1 | 10/2010 | Murphy et al. |
| 2010/0260187 A1 | 10/2010 | Ongole et al. |
| 2011/0010498 A1* | 1/2011 | Lay et al. ...................... 711/115 |
| 2011/0016083 A1* | 1/2011 | Patterson ...................... 707/610 |
| 2011/0173605 A1 | 7/2011 | Bourne |
| 2011/0218969 A1 | 9/2011 | Anglin et al. |
| 2011/0238775 A1 | 9/2011 | Wu et al. |
| 2011/0276737 A1 | 11/2011 | Mei et al. |
| 2012/0079221 A1* | 3/2012 | Sivasubramanian et al. . 711/162 |
| 2012/0109894 A1 | 5/2012 | Kishi |
| 2012/0136832 A1 | 5/2012 | Sadhwani |
| 2012/0136834 A1 | 5/2012 | Zhao |
| 2012/0150949 A1* | 6/2012 | Vijayan Retnamma et al. ............................. 709/203 |
| 2012/0151177 A1 | 6/2012 | Kalach et al. |
| 2012/0151586 A1 | 6/2012 | Hentunen |
| 2012/0158660 A1* | 6/2012 | Hirsch ........................ 707/640 |
| 2012/0198219 A1* | 8/2012 | Preimesberger et al. ......... 713/2 |
| 2012/0246457 A1* | 9/2012 | Sosnosky et al. ................. 713/2 |
| 2013/0024424 A1 | 1/2013 | Prahlad et al. |
| 2013/0042083 A1* | 2/2013 | Mutalik et al. ................. 711/162 |
| 2013/0046944 A1 | 2/2013 | Domyo et al. |
| 2013/0138620 A1* | 5/2013 | Yakushev et al. ............. 707/698 |
| 2013/0179407 A1 | 7/2013 | Stoakes |
| 2014/0181039 A1* | 6/2014 | Harrison et al. .............. 707/652 |

OTHER PUBLICATIONS

U.S. Appl. No. 13/782,807, filed Mar. 1, 2013, tiled "Change Tracking for Multiphase Deduplication".
U.S. Appl. No. 13/782,822, filed Mar. 1, 2013, tiled "Restoring a Backup From a Deduplication Vault Storage".
U.S. Appl. No. 13/782,717, filed Mar. 1, 2013, tiled "Deduplication Vault Storage Seeding".
U.S. Appl. No. 13/782,549, filed Mar. 1, 2013, tiled "Multiphase Deduplication".
U.S. Appl. No. 13/782,822, Jun. 5, 2013, Office Action.
U.S. Appl. No. 13/782,807, Jul. 3, 2013, Office Action.
U.S. Appl. No. 13/782,549, Jun. 24, 2013, Office Action.
U.S. Appl. No. 13/782,717, Jun. 13, 2013, Office Action.
U.S. Appl. No. 13/782,986, Jun. 10, 2013, Office Action.
U.S. Appl. No. 13/782,822, Oct. 10, 2013, Office Action.
U.S. Appl. No. 13/782,807, Nov. 7, 2013, Office Action.
U.S. Appl. No. 13/782,549, Oct. 7, 2013, Office Action.
U.S. Appl. No. 13/782,986, Nov. 1, 2013, Notice of Allowance.
U.S. Appl. No. 13/782,717, Oct. 7, 2013, Office Action.
U.S. Appl. No. 14/166,569, filed Jan. 28, 2014 titled "Virtual Defragmentation in a Deduplication Vault".
"10800:Acronis Backup & Recovery 10: Deduplication Best Pratices"; May 11, 2012; Updated Jan. 13, 2012; Webpage: http://kb.acronis.com/content/10800.
U.S. Appl. No. 13/782,822, Feb. 25, 2014, Office Action.
U.S. Appl. No. 13/782,822, Mar. 21, 2014, Notice of Allowance.
U.S. Appl. No. 13/782,807, Jan. 17, 2014, Office Action.
U.S. Appl. No. 13/782,807, Mar. 13, 2014, Notice of Allowance.
U.S. Appl. No. 14/166,569, Mar. 14, 2014, Office Action.

* cited by examiner

LOCAL SEEDING OF A RESTORE STORAGE FOR RESTORING A BACKUP FROM A REMOTE DEDUPLICATION VAULT STORAGE

FIELD

The embodiments disclosed herein relate to local seeding of a restore storage for restoring a backup from a remote deduplication vault storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of backup storage and increase the bandwidth overhead of transporting data to the backup storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to local seeding of a restore storage for restoring a backup from a remote deduplication vault storage. The example methods disclosed herein may be employed to seed common backup data, such as common operating system data and common application data, in a seeded storage that is local to the restore storage. Seeding common backup data in the local seeded storage may result in at least some portion of the data from the backup already being duplicated in the local seeded storage at the time that a backup of the source storage is restored to the restore storage, thereby enabling this portion of the data to be locally copied from the seeded storage and decreasing the amount of data that must be remotely copied from the remote vault storage. Decreasing the amount of data that must be remotely copied from the remote vault storage to the local restore storage during the restoring of a backup may result in decreased bandwidth overhead of transporting data to the restore storage and increased efficiency and speed during the restoration of each backup.

In one example embodiment, a method of local seeding of a restore storage for restoring a backup from a remote deduplication vault storage includes determining which blocks included in a backup of a source storage at a point in time, which is stored in the remote vault storage, are available in a local seeded storage containing common blocks, reading the locally available blocks from the local seeded storage, reading the non-locally available blocks from the remote vault storage, and storing the read blocks in the restore storage in the same position as stored in the source storage at the point in time. The remote vault storage is remote from the restore storage and the local seeded storage is local to the restore storage.

In another example embodiment, a method of local seeding of a restore storage for restoring a backup from a remote deduplication vault storage includes storing, in the remote vault storage, each unique block from a source storage at a point in time that is not already duplicated in the remote vault storage such that a backup of the source storage at the point in time is stored in the remote vault storage, determining which blocks included in the backup are available in a local seeded storage containing common blocks, reading the locally available blocks from the local seeded storage, reading the non-locally available blocks from the remote vault storage, and storing the read blocks in the restore storage in the same position as stored in the source storage at the point in time. The remote vault storage is remote from the restore storage and the local seeded storage is local to the restore storage.

In yet another example embodiment, a method of local seeding of a restore storage for restoring a backup from a remote deduplication vault storage includes analyzing each allocated block stored in a source storage at a point in time to determine if the block is duplicated in the remote vault storage, storing, in the remote vault storage, each unique nonduplicate block from the source storage such that a backup of the source storage at the point in time is stored in the remote vault storage, determining which blocks included in the backup are available in a local seeded storage containing common blocks, reading the locally available blocks from the local seeded storage, reading the non-locally available blocks from the remote vault storage, and storing the read blocks in the restore storage in the same position as stored in the source storage at the point in time. The remote vault storage is remote from a restore storage and the local seeded storage is local to the restore storage.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include local seeding of a restore storage for restoring a backup from a remote deduplication vault storage. The example methods disclosed herein may be employed to seed common backup data, such as common operating system data and common application data, in a seeded storage that is local to the restore storage. Seeding common backup data in the local seeded storage may result in at least some portion of the data from the backup already being duplicated in the local seeded storage at the time that a backup of the source storage is restored to the restore storage, thereby enabling this portion of the data to be locally copied from the seeded storage and decreasing the amount of data that must be remotely copied from the remote vault storage. Decreasing the amount of data that must be remotely copied from the remote vault storage to the local restore storage during the restoring of a backup may result in decreased bandwidth overhead of transporting data to the restore storage and increased efficiency and speed during the restoration of each backup.

The term "storage" as used herein refers to computer-readable media, or some logical portion thereof such as a volume, capable of storing data in blocks. The term "block" as used herein refers to a fixed-length discrete sequence of bits. The term "run" as used herein refers to one or more blocks stored sequentially on a storage. The term "backup" when used herein as a noun refers to a copy or copies of one or more blocks from a storage. The term "local storage" as used herein refers to a storage that is local to another storage such that the storages can communicate blocks of data between one another without transporting the blocks of data over the internet. The term "remote storage" as used herein refers to a storage that is remote to another storage such that the storages cannot communicate blocks of data between one another without transporting the blocks of data over the internet.

Figure 1:
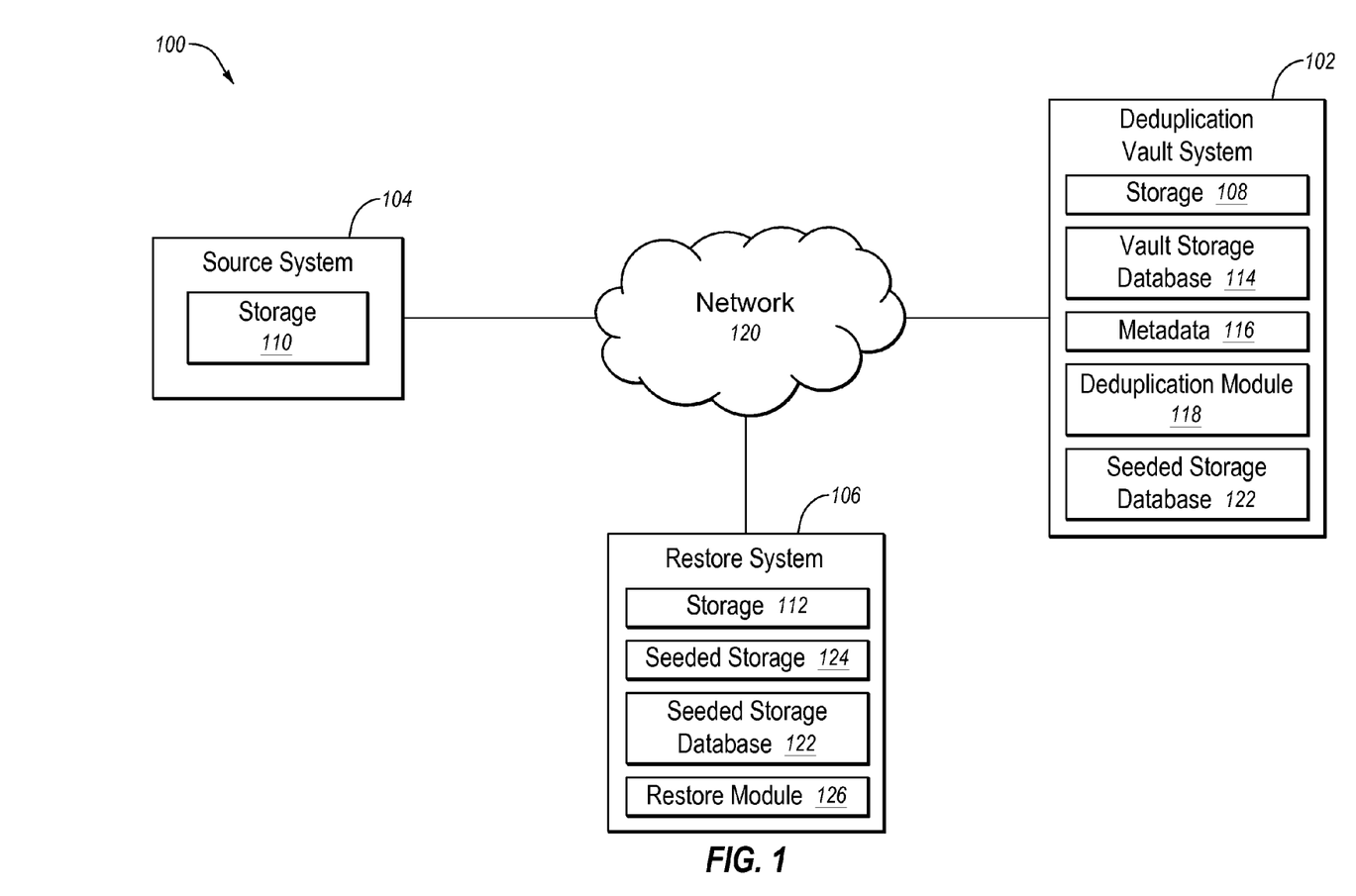
FIG. 1 is a schematic block diagram illustrating an example deduplication backup system.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, a deduplication module 118, and a seeded storage database 122. The restore system 106 also includes a seeded storage 124, a local copy of the seeded storage database 122, and a restore module 126. The systems 102, 104, and 106 are able to communicate with one another over a network 120.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 120 includes the internet and may also additionally include any other wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network, or some combination thereof. Since the network 120 includes the internet, each of the storages 108, 110, and 112 of the systems 102, 104, and 106, respectively, are remote storages with respect to one another. In particular, the vault storage 108 is a remote storage with respect to the restore storage 112. However, the seeded storage 124 is a local storage with respect to the restore storage 112. Since transporting data from a local storage is generally faster than transporting data from a remote storage, copying data from the local seeded storage 124 to the restore storage 112 is generally faster than copying data from the remote vault storage 108 to the restore storage 112.

During performance of the example methods disclosed herein, the restore module 126 may determine which blocks included in a backup of the source storage 110, which is stored in the remote vault storage 108, are available in the local seeded storage 124. Then, the restore module 126 may read the locally available blocks from the local seeded storage 124 and read the non-locally available blocks from the remote vault storage 108. Finally, the restore module 126 may store the read blocks in the restore storage 112 to restore the backup to the restore storage 112. The database 114 and the metadata 116 may be employed to track information related to the source storage 110, the vault storage 108, and the backup of the source storage 110 that is stored in the vault storage 108. For example, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety. Similarly, the seeded storage database 122 may be employed to track information related to the seeded storage 124. In particular, the seeded storage database 122 may be employed to track which common blocks are stored in the seeded storage 124. The seeded storage database 122 may be identical in structure and function with respect to the seeded storage 124 as the vault storage database 114 is with respect to the vault storage 108. In addition, as disclosed in FIG. 1, the seeded storage database 122 may be duplicated on the deduplication vault system 102 in order to enable the seeded storage database 122 to be locally compared to the vault storage database 114 and to the metadata 116 without sending data over the network 120.

As discussed in greater detail below, seeding the restore storage 112 with common blocks of data prior to the restoration of a backup of the source storage 110 may result in at least some portion of the data from the backup already being duplicated in the local seeded storage 124 at the time that the backup of the source storage 110 is restored to the restore storage 112, thereby enabling this portion of the data to be locally copied from the seeded storage 124 and decreasing the amount of data that must be remotely copied from the remote vault storage 108. Decreasing the amount of data that must be remotely copied from the remote vault storage 108 to the local restore storage 112 during the restoring of a backup may result in decreased bandwidth overhead of transporting data to the restore storage 112 and increased efficiency and speed during the restoration of each backup.

In one example embodiment, the deduplication vault system 102 may be a file server, the source system 104 may be a first desktop computer, the restore system 106 may be a second desktop computer, and the seeded storage 124 may be a USB flash drive that is directly connected to a USB port of the second desktop computer. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable. The USB flash drive may store common data, such as file system and application files, so that when the most recent backup is restored to the storage of the second desktop computer, some of the data included in the backup can be locally retrieved relatively quickly from the USB flash drive over the USB port of the second desktop computer instead of being remotely retrieved relatively slowly over the internet from the file server, thus speeding up the restoration of the backup and decreasing the bandwidth overhead of transporting data over the internet.

Although only a single storage is disclosed in each of the systems 102 and 104 in FIG. 1, it is understood that any of the systems 102, 104, or 106 may include two or more storages. Further, in some embodiments the systems 104 and 106 may be combined into a single system. Also, although the storages 110 and 112 are disclosed as separate storages, it is understood that the storages 110 and 112 may be combined into a single storage. For example, in some embodiments the storage 112 may function as both a source storage during the creation of a backup and a restore storage during a restore of the backup, which may enable the storage 112 to be restored to a state of an earlier point in time. Further, although the deduplication module 118 and the restore module 126 are the only modules disclosed in the example deduplication backup system 100 of FIG. 1, it is understood that the functionality of the modules 118 and 126 may be replaced or augmented by one or more similar modules residing on any of the systems 102, 104, and 106. Finally, although only a single source storage and a single restore storage are disclosed in the example deduplication backup system 100 of FIG. 1, it is understood that the deduplication vault system 102 of FIG. 1 is configured to simultaneously back up or restore multiple source storages. For example, the greater the number of storages that are backed up to the vault storage 108 of the deduplication vault system 102, the greater the likelihood for reducing redundancy and overall size of the data being backed up, resulting in corresponding decreases in the bandwidth overhead of transporting data to the backup storage.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
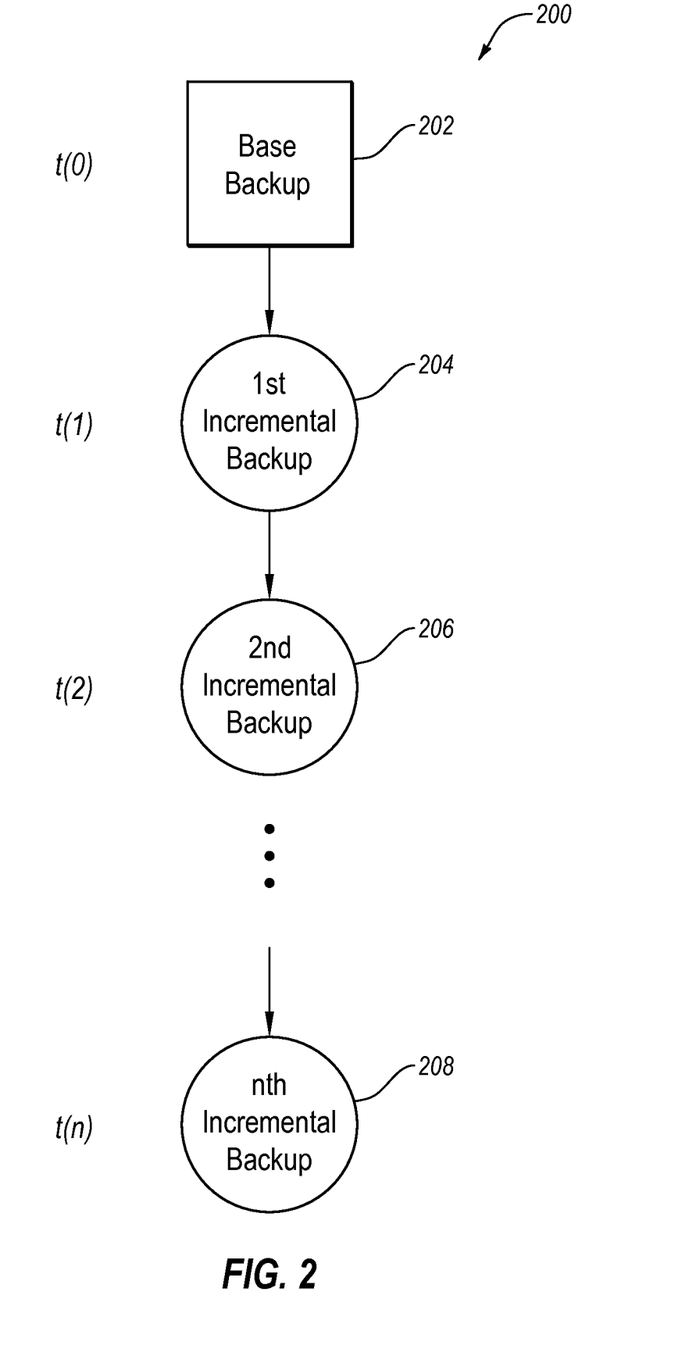
FIG. 2 is a schematic flowchart illustrating an example method for creating a base backup and multiple incremental backups of a source storage.

FIG. 2 is a schematic flowchart illustrating an example method 200 for creating a base backup and multiple incremental backups of a source storage. The method 200 may be implemented, in at least some embodiments, by the deduplication module 118 of the deduplication vault system 102 of FIG. 1. For example, the deduplication module 118 may be configured to execute computer instructions to perform operations of creating a base backup and multiple incremental backups of the source storage 110, as represented by one or more of steps 202-208 of the method 200. Although illustrated as discrete steps, various steps may be divided into additional steps, combined into fewer steps, or eliminated, depending on the desired implementation. The method 200 will now be discussed with reference to FIGS. 1 and 2.

The method 200 may begin at step 202, in which a base backup is created to capture the state at time t(0). For example, the deduplication module 118 may create a base backup of all allocated blocks of the source storage 110 as allocated at time t(0) and store the allocated blocks in the vault storage 108. The state of the source storage 110 at time t(0) may be captured using snapshot technology in order to capture the data stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the vault storage 108.

At steps 204 and 206, 1st and 2nd incremental backups are created to capture the states at times t(1) and t(2), respectively. For example, the deduplication module 118 may create a 1st incremental backup of only changed allocated blocks of the source storage 110 present at time t(1) and store the changed allocated blocks in the vault storage 108, then later create a 2nd incremental backup of only changed allocated blocks of the source storage 110 present at time t(2) and store the changed allocated blocks in the vault storage 108. The states of the source storage 110 at times t(1) and t(2) may again be captured using snapshot technology, thus avoiding downtime of the source storage 110. Each incremental backup includes only those allocated blocks from the source storage 110 that were changed after the time of the previous backup. Thus, the 1st incremental backup includes only those allocated blocks from the source storage 110 that changed between time t(0) and time t(1), and the 2nd incremental backup includes only those allocated blocks from the source storage 110 that changed between time t(1) and time t(2). In general, as compared to the base backup, each incremental backup may take a relatively short time to create and consume a relatively small storage space in the vault storage 108.

At step 208, an nth incremental backup is created to capture the state at time t(n). For example, the deduplication module 118 may create an nth incremental backup of only changed allocated blocks of the source storage 110 present at time t(n), using snapshot technology, and store the changed allocated blocks in the vault storage 108. The nth incremental backup includes only those allocated blocks from the source storage 110 that changed between time t(n) and time t(n−1).

As illustrated in the example method 200, incremental backups may be created on an ongoing basis. The frequency of creating new incremental backups may be altered as desired in order to adjust the amount of data that will be lost should the source storage 110 experience corruption of its stored data or become unavailable at any given point in time. The data from the source storage 110 can be restored to the state at the point in time of a particular incremental backup by applying the backups from oldest to newest, namely, first applying the base backup and then applying each successive incremental backup up to the particular incremental backup.

Although only allocated blocks are backed up in the example method 200, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only a base backup and incremental backups are created in the example method 200, it is understood that the source storage 110 may instead be backed up by creating a base backups and decremental backups. Decremental backups are created by initialing creating a base backup to capture the state at a previous point in time, then updating the base backup to capture the state at a subsequent point in time by modifying only those blocks in the base backup that changed between the previous and subsequent points in time. Prior to the updating of the base backup, however, the original blocks in the base backup that correspond to the changed blocks are copied to a decremental backup, thus enabling restoration of the source storage 110 at the previous point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the creation of backups as disclosed herein is not limited to a base backup and incremental backups but may also include a base backup and decremental backups.

Figure 3:
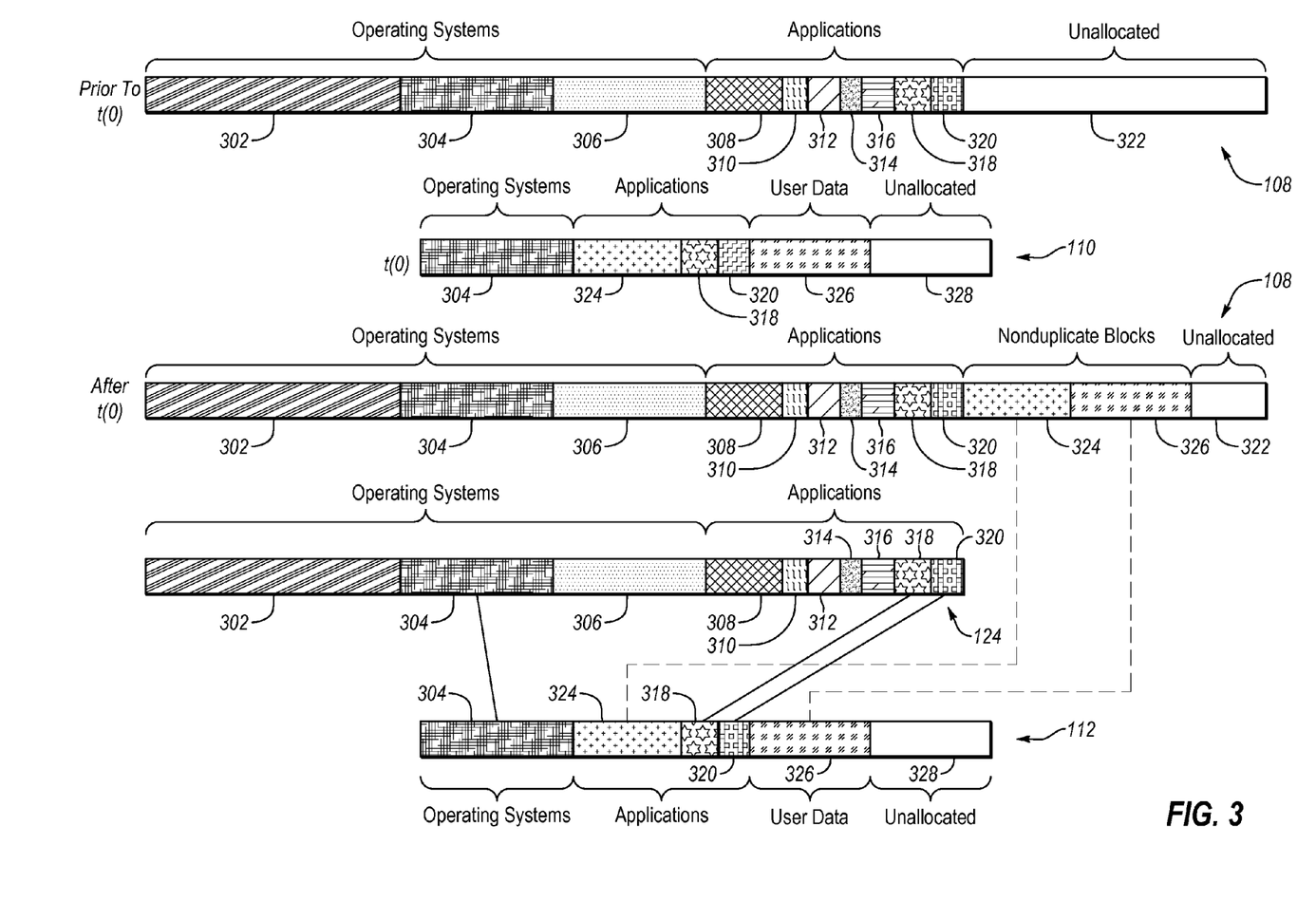
FIG. 3 is a schematic block diagram illustrating an example source storage, an example remote vault storage, an example local seeded storage, and an example restore storage.

FIG. 3 is a schematic block diagram illustrating an example source storage 110, an example remote vault storage 108, an example local seeded storage 124, and an example restore storage 112. The restore module 126 of the restore system 106 of FIG. 1 may, in at least some embodiments, employ the local seeded storage 124 to locally seed the restore storage 112. For example, the restore module 126 may be configured to execute computer instructions to perform an operation of local seeding of the restore storage 112 when restoring a backup from the remote vault storage 108.

As disclosed in FIG. 3, the storages 108, 110, 112, and 124 are each partitioned into a physical layout of runs 302-328. Each of the runs 302-328 includes multiple blocks. In some example embodiments, the size of each block is 4096 bytes, although any other block size could instead be employed. The size of each block may be configured to match the standard sector size of a file system of the storages 108, 110, 112, and 124. In some example embodiments, the total number of blocks in the vault storage 108 may be greater than the total number of blocks in the source storage 110 in order to allow multiple storages to be backed up in the vault storage 108. In some example embodiments, the storages 108, 110, 112, and 124 may each have millions or even billions of blocks, or more. The blank runs illustrated in FIG. 3 represent unallocated blocks. Each run illustrated with a unique pattern in FIG. 3 represents a unique run of allocated blocks.

As disclosed in FIG. 3, the seeded storage 124 may be seeded with common blocks of data. For example, the seeded storage 124 may be seeded with runs 302, 304, and 306, which each makes up the files of a common operating system. The runs 302, 304, and 306 may each be stored in the seeded storage 124 in the sequence of a clean install of the operating system. In this example, where each block is 4096 bytes in length, the run 302 may include the 2,621,440 blocks that make up a clean install of the 10 gigabytes of files of the WINDOWS® 7 operating system, the run 304 may include the 1,572,864 blocks that make up a clean install of the 6 gigabytes of files of the Linux 3.6.6 operating system, and the run 306 may include the 2,359,296 blocks that make up a clean install of the 9 gigabytes of files of the WINDOWS® 8 operating system. It is understood that the gigabyte sizes listed in this example are estimates only.

In addition, the seeded storage 124 may be seeded with runs 308-320, which each makes up the files of a common software application. The runs 308-320 may each be stored in the seeded storage 124 in the sequence of a clean install of the software application. Continuing with the example above, the run 308 may include the 786,432 blocks that make up a clean install of the 3 gigabytes of files of the MICROSOFT® Office 2010 software application, and each run 310-320 may include the blocks that make up a clean install of the files of the Adobe Photoshop Elements 11 software application, the Norton Internet Security 2013 software application, the Quicken Deluxe 2013 software application, the QuickBooks Pro 2013 software application, the Adobe Reader software application, and the Firefox Browser software application, respectively.

In addition, as disclosed in FIG. 3, the vault storage 108 may also be seeded prior to time t(0) with common blocks of data. For example, the vault storage 108 may be seeded with the same runs 302-320 as the seeded storage 124. Further, the common blocks of data may be seeded in the vault storage 108 in the same sequence as seeded in the seeded storage 124. For example, the vault storage 108 may be seeded with the runs 302-320 in the same sequence as runs 302-320 are seeded in the seeded storage 124. Seeding blocks in both the vault storage 108 and the seeded storage 124 in the same sequence may enable increased efficiency and speed during the restoration of each backup.

Continuing with the above example, the source storage 110 at time t(0) includes a clean install of the Linux 3.6.6 operating system included in the run 304, a clean install of the Quicken Deluxe 2013 software application included in the run 318, and a clean install of the QuickBooks Pro 2013 software application included in the run 320. Each of the runs 304, 318, and 320 stored in the source storage 110 at time t(0) is identical to each of the runs 304, 318, and 320, respectively, that was stored in the vault storage 108 prior to the time t(0) during the seeding of the vault storage 108. Thus, at the time of the creation of a backup of the source storage 110 at time t(0), all of the blocks in the runs 304, 318, and 320 are already duplicated in the vault storage 108. In this example, the seeding of the vault storage 108 with the runs 304, 318, and 320 that make up the files of a common operating system and common software applications, prior to the backing up of the source storage 110 at time t(0), results in an increase in the number of blocks from the source storage 110 that are already duplicated in the vault storage 108.

Further, each of the runs 304, 318, and 320 stored in the source storage 110 at time t(0) is identical to each of the runs 304, 318, and 320, respectively, that was stored in the seeded storage 124 prior to the restoration of the base backup. Thus, during the restoration of the base backup of the source storage 110 to restore the state at time t(0), all allocated blocks of the source storage 110 do not need to be transported relatively slowly from the remote vault storage 108 to the restore storage 112. Instead, only the nonduplicate blocks in the runs 324 and 326 need to be transported relatively slowly from the remote vault storage 108, as illustrated by the dashed lines in FIG. 3, and the duplicate blocks in the runs 304, 318, and 320 can be locally retrieved relatively quickly from the local seeded storage 124, as illustrated by the solid lines in FIG. 3. Thus, the seeding of the seeded storage 124 with common blocks and locally connecting the seeded storage 124 to the restore storage 112 prior to the restoration of the backup results in increased efficiency and speed during the restoration of the backup. Further, seeding the seeded storage 124 with each of the runs 304, 318, and 320 in the sequence of a clean install may further increase the efficiency and speed during the restoration of the backup, as discussed in greater detail below.

It is understood that the above example is but one implementation of locally seeding a restore storage, and other implementations are possible and contemplated. For example, it is understood that there may be duplicate blocks in a clean install of a common operating system or software application, and only unique blocks may be stored in the vault storage 108 and the seeded storage 124. It is further understood that minor variations may exist in files, and corresponding blocks, between clean installs of a common operating system or software application, due to differences in hardware and other factors, but seeding the vault storage 108 and the seeded storage 124 may still be beneficial because many or most blocks may still be identical between clean installs and thus may still avoid being transported from the source storage 110 to the vault storage 108 during the creation of a backup of the source storage 110 and transported from the vault storage 108 to the restore storage 112 during the restoration of the backup.

It is also understood that the seeding of the vault storage 108 and/or the seeded storage 124 may extend beyond an initial seeding that is performed prior to the storing of backups in the vault storage 108 to ongoing seedings of common blocks. For example, where new operating systems or new software applications are developed after backups have already been stored in the vault storage 108, these new operating systems or software applications may be seeded into the vault storage 108 and/or the seeded storage 124 on an ongoing basis. Therefore, the seeding of the vault storage 108 and/or the seeded storage 124 with common blocks is not limited to being performed when the vault storage 108 is largely or completely unallocated, but may also be performed on an ongoing basis even after large portions of the vault storage 108 have been allocated.

It is further understood that the above implementation of seeding a storage is but one example implementation of the order in which common blocks may be positioned during seeding. In other implementations, blocks from common operating system files may be positioned next to blocks from common software application files, instead of seeding the storage with blocks from common operating system files separately from blocks from common software application files. For example, blocks from a common WINDOWS® operating system may be positioned next to blocks from common WINDOWS® software application files, and blocks from a common Linux operating system may be positioned next to blocks from common Linux software application files, and the WINDOWS® and Linux blocks may be separated with unallocated blocks for future seeding. Therefore, common blocks may be positioned in various orders during the seeding of a storage, for example to match the positioning of the common blocks in source storages.

Figure 4:
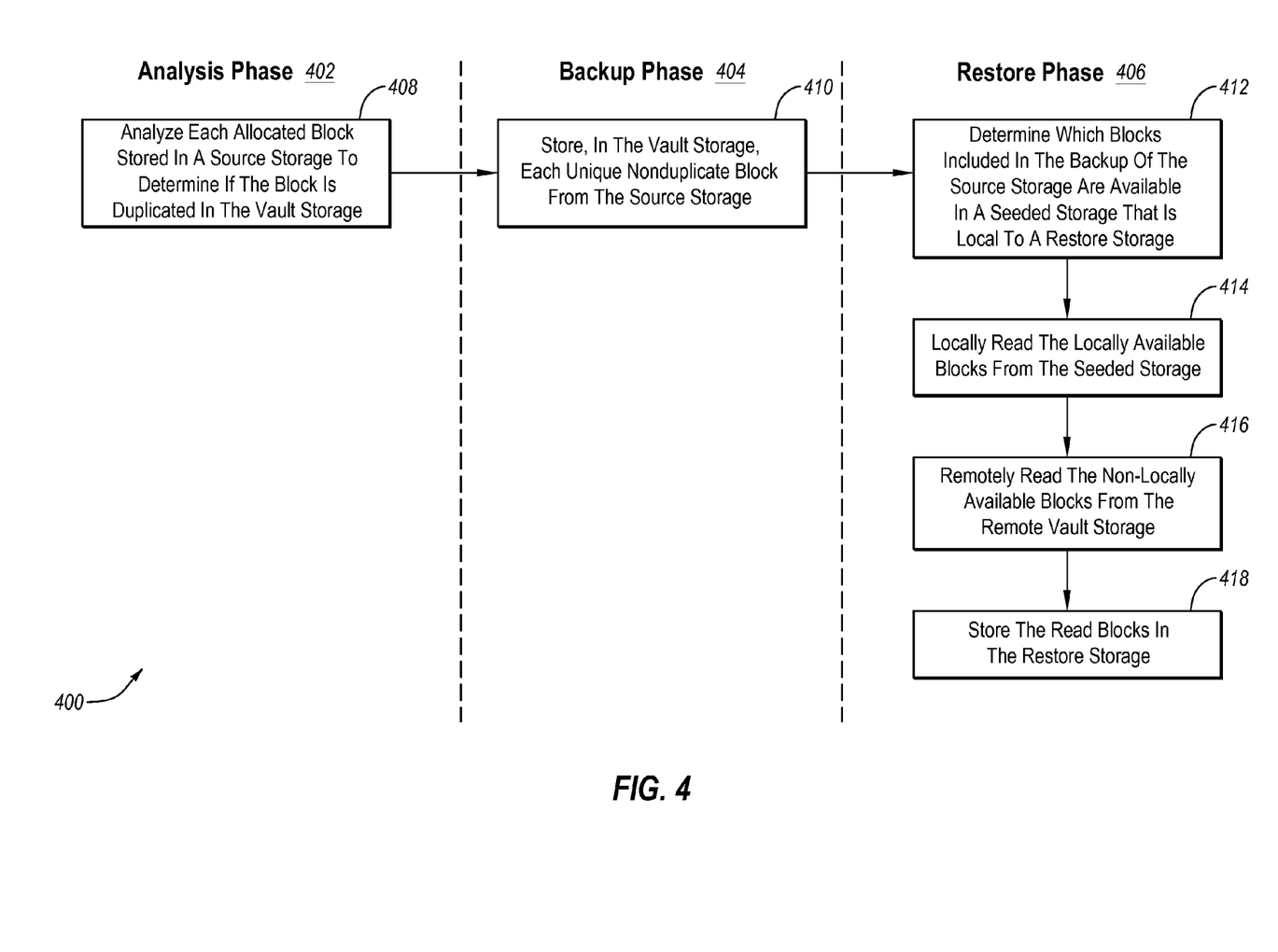
FIG. 4 is a schematic flowchart diagram of an example method of local seeding for restoring a backup from a deduplication vault storage.

FIG. 4 is a schematic flowchart diagram of an example method 400 of local seeding for restoring a backup from a deduplication vault storage. The method 400 may be implemented, in at least some embodiments, by the restore module 126 and the deduplication module 118 of the deduplication vault system 102 of FIG. 1. For example, the restore module 126 and the deduplication module 118 may be configured to execute computer instructions to perform operations of local seeding of the restore storage 112 during the restoring of a backup of the source storage 110 to the restore storage 112, as represented by one or more of phases 402-406 which are made up of the steps 408-418 of the method 400. Although illustrated as discrete phases and steps, various phases/steps may be divided into additional phases/steps, combined into fewer phases/steps, or eliminated, depending on the desired implementation. The method 400 will now be discussed with reference to FIGS. 1, 3, and 4.

The analysis phase 402 of the method 400 may include a step 408, in which each allocated block stored in a source storage is analyzed to determine if the block is duplicated in the vault storage. For example, the deduplication module 118 may analyze each allocated block stored in a source storage 110 at time t(0) to determine that the runs 304, 318, and 320 were already duplicated in the vault storage 108 prior to time t(0).

The backup phase 404 of the method 400 may include a step 410, in which each unique nonduplicate block from the source storage is stored in the vault storage. For example, the deduplication module 118 may store the runs 324 and 326 from the source storage 110, which were determined during the analysis phase 402 to be unique nonduplicate blocks, in the vault storage 108 such that a backup of the source storage 110 at time t(0) is stored in the vault storage 108.

By the conclusion of the backup phase 404, a base backup of the source storage 110 will have been stored in the vault storage 108. Unlike a standard base backup image, however, the backup of the source storage 110, as stored in the vault storage 108, will likely have been reduced in size due to the elimination of duplicate blocks within the base backup. In addition, where multiple storages are backed up into the vault storage 108, the total overall size of the backups will likely be reduced in size due to the elimination of duplicate blocks across the backups. It is noted that the analysis phase 402 and the backup phase 404 can also be employed to create an incremental backup of a storage, which will store and track only those allocated blocks in the source storage 110 that changed between a point in time of a previous backup and the point in time of the incremental backup.

The restore phase 406 of the method 400 may include a step 412, in which it is determined which blocks included in the backup of the source storage are available in a seeded storage that is local to a restore storage. For example, the deduplication module 118 may determine that the runs 304, 318, and 320 from the backup of the source storage 110 are available in the seeded storage 124 that is local to the restore storage 112. The deduplication module 118 may make this determination by comparing the information about the backup that is stored in the metadata 116 to the information about the seeded storage 124 that is stored in the seeded storage database 122.

As noted previously, the seeded storage 124 may contain common blocks which may include blocks that make up one or more files of an operating system or a software application. Further, the blocks that make up the one or more files of the operating system or the software application in the vault storage 108 may be stored in the sequence of a clean install of the operating system or the software application.

Further, where it is known in advance that a particular source storage will eventually be backed up to the vault storage and eventually restored, and the particular operating system and/or the particular software applications installed in the source storage are known, the particular operating system and/or the particular software applications can be included in the common blocks seeded into the seeded storage. For example, and as disclosed in FIG. 3, where it is known in advance that the source storage 110 will eventually be backed up to the vault storage 108 and eventually restored, and it is known that the Linux 3.6.6 operating system and the Quicken Deluxe 2013 and QuickBooks Pro 2013 software applications are installed in the source storage 110, the run 304 (which includes the blocks that make up a clean install of the Linux 3.6.6 operating system) and the runs 318 and 320 (which include the blocks that make up clean installs of the Quicken Deluxe 2013 and QuickBooks Pro 2013 software applications, respectively) can be included in the common blocks seeded into the seeded storage 124.

The restore phase 406 of the method 400 may also include a step 414, in which the locally available blocks from the seeded storage are locally read. For example, the restore module 126 may locally read the locally available runs 304, 318, and 320 from the local seeded storage 124 using the local copy of the seeded storage database 122 to determine the location of the runs 304, 318, and 320 in the local seeded storage 124.

The restore phase 406 of the method 400 may further include a step 416, in which the non-locally available blocks are remotely read from the remote vault storage. For example, the restore module 126 may remotely read the non-locally available runs 324 and 326 from the remote vault storage 108.

The restore phase 406 of the method 400 may also include a step 418, in which the read blocks are stored in the restore storage. For example, the restore module 126 may store the runs 304, 318, and 320 that were read from the local seeded storage 124 and the runs 324 and 326 that were read from the remote vault storage 108 in the restore storage 112 in the same position as stored in the source storage 110 at time t(0).

Seeding the seeded storage 124 with common blocks of data prior to the restoration of a backup of the source storage during the restore phase 406 results in the runs 304, 318, and 320 from the backup already being duplicated in the local seeded storage 124 during the restore phase 406, thereby enabling the runs 304, 318, and 320 to be locally copied from the seeded storage 124 and decreasing the amount of data that must be remotely copied from the remote vault storage 108. Decreasing the amount of data that must be remotely copied from the remote vault storage 108 to the local restore storage 112 during the restore phase 406 results in decreased bandwidth overhead of transporting data to the restore storage 112 and increased efficiency and speed during the restoration of the backup.

Also, as noted previously in connection with FIG. 3, since both the seeded storage 124 and the source storage 110 include runs in the sequence of a clean install of the files that make up the operating and two software applications, namely runs 304, 318, and 320, the seeding of the seeded storage 124 may further increase the efficiency and speed during the restoration of the backup during the restore phase 406 due to the blocks not needing extensive reordering when restoring from the seeded storage 124 to the restore storage 112. This lack of a need of extensive reordering may be due, at least in part, to the fact that a clean install of the files that make up an operating and/or a software application places the files, and the blocks that make up the files, in a generally defragmented sequence.

The analysis phase 402 and the backup phase 404 may be accomplished, for example, by performing the steps of the analysis phase 802 and the backup phase 804 disclosed in related U.S. patent application Ser. No. 13/782,549, referenced above.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

What is claimed is:

1. A method of local seeding of a restore storage for restoring a backup from a remote deduplication vault storage, the method comprising:
   storing, in a remote deduplication vault storage that is remote from a restore storage, an image-based backup of a source storage, the image-based backup including unique blocks that were stored in the source storage at a point in time, at least a portion of the unique blocks being not already duplicated in the remote deduplication vault storage;
   storing a list of the unique blocks that were stored in the source storage at the point in time;
   storing positions of the unique blocks that were stored in the source storage at the point in time;
   storing, in a local seeded storage that is local to the restore storage, common blocks;
   determining which of the unique blocks included in the list are available in the local seeded storage as locally available blocks;
   determining which of the unique blocks included in the list are only available in the remote deduplication vault storage as non-locally available blocks;
   reading the locally available blocks from the local seeded storage;
   reading the non-locally available blocks from the remote deduplication vault storage; and
   storing the read locally available blocks and the read non-locally available blocks in the restore storage in the same positions as stored in the source storage at the point in time.

2. The method as recited in claim 1, wherein the common blocks include blocks that make up one or more files of an operating system.

3. The method as recited in claim 2, wherein the local seeded storage contains the blocks that make up the one or more files of the operating system in the sequence of a clean install of the operating system.

4. The method as recited in claim 2, wherein the operating system is installed in the source storage.

5. The method as recited in claim 1, wherein the common blocks include blocks that make up one or more files of a software application.

6. The method as recited in claim 5, wherein the local seeded storage contains the blocks that make up the one or more files of the software application in the sequence of a clean install of the software application.

7. The method as recited in claim 5, wherein the software application is installed in the source storage.

8. The method as recited in claim 1, wherein the local seeded storage contains the common blocks in the sequence that the common blocks are stored in the remote deduplication vault storage.

9. A non-transitory computer-readable medium storing a program that causes a processor to execute the method as recited in claim 1.

10. The method as recited in claim 1, wherein the common blocks include blocks that make up one or more files of an operating system that is installed in the source storage.

11. The method as recited in claim 10, wherein the local seeded storage contains the blocks that make up the one or more files of the operating system in the sequence of a clean install of the operating system.

12. The method as recited in claim 1, wherein the common blocks include blocks that make up one or more files of a software application that is installed in the source storage.

13. The method as recited in claim 12, wherein the local seeded storage contains the blocks that make up the one or more files of the software application in the sequence of a clean install of the software application.

14. The method as recited in claim 1, wherein:
   the determining which of the unique blocks included in the list are available in the local seeded storage includes identifying all of the unique blocks in the list having hash values that match hash values of the common blocks contained in the local seeded storage; and
   the determining which of the unique blocks included in the list are only available in the remote deduplication vault storage includes identifying all of the unique blocks in the list having hash values that do not match the hash values of the common blocks contained in the local seeded storage.

15. A method of local seeding of a restore storage for restoring a backup from a remote deduplication vault storage, the method comprising:
   analyzing allocated blocks stored in a source storage at a point in time to determine if the allocated blocks are duplicated in a remote deduplication vault storage that is remote from a restore storage;
   after the analyzing is complete, storing, in the remote deduplication vault storage, an image-based backup of the source storage by storing unique nonduplicate allocated blocks from the source storage at the point in time in the remote deduplication vault storage, with at least a portion of the unique nonduplicate allocated blocks being not already duplicated in the remote deduplication vault storage, and by storing a list of the unique nonduplicate allocated blocks that were stored in the source storage at the point in time and by storing positions of the unique nonduplicate allocated blocks that were stored in the source storage at the point in time;
   storing, in a local seeded storage that is local to the restore storage, common blocks;
   determining which of the unique nonduplicate allocated blocks included in the list are available in the local seeded storage as locally available blocks;
   determining which of the unique nonduplicate allocated blocks included in the list are only available in the remote deduplication vault storage as non-locally available blocks;
   reading the locally available blocks from the local seeded storage;
   reading the non-locally available blocks from the remote deduplication vault storage; and
   storing the read locally available blocks and the read non-locally available blocks in the restore storage in the same positions as stored in the source storage at the point in time.

16. The method as recited in claim 15, wherein the common blocks include blocks that make up one or more files of an operating system or software application that is installed in the source storage and the blocks that make up the one or more files of the operating system or software application are stored in the local seeded storage in the sequence of a clean install of the operating system or software application.

17. The method as recited in claim 15, wherein the local seeded storage contains the common blocks in the sequence that the common blocks are stored in the remote deduplication vault storage.

18. A non-transitory computer-readable medium storing a program that causes a processor to execute the method as recited in claim 15.

19. The method as recited in claim 15, wherein:

the determining which of the unique nonduplicate allocated blocks included in the list are available in the local seeded storage includes identifying all of the unique nonduplicate allocated blocks in the list having hash values that match hash values of the common blocks contained in the local seeded storage; and the determining which of the unique nonduplicate allocated blocks included in the list are only available in the remote deduplication vault storage includes identifying all of the unique nonduplicate allocated blocks in the list having hash values that do not match the hash values of the common blocks contained in the local seeded storage.

\* \* \* \* \*

UNITED STATES PATENT AND TRADEMARK OFFICE
CERTIFICATE OF CORRECTION

PATENT NO. : 8,874,527 B2  Page 1 of 1
APPLICATION NO. : 13/782957
DATED : October 28, 2014
INVENTOR(S) : Gardner et al.

It is certified that error appears in the above-identified patent and that said Letters Patent is hereby corrected as shown below:

In the Specification

In Column 4, Line 15, delete "internet" and insert -- Internet --, therefor.

In Column 4, Lines 18-19, delete "internet" and insert -- Internet --, therefor.

In Column 4, Line 39, delete "internet" and insert -- Internet --, therefor.

In Column 4, Line 46, delete "internet" and insert -- Internet --, therefor.

In Column 5, Line 43, delete "internet" and insert -- Internet --, therefor.

In Column 5, Line 46, delete "internet" and insert -- Internet --, therefor.

In Column 5, Line 55, delete "internet" and insert -- Internet --, therefor.

In Column 5, Line 57, delete "internet" and insert -- Internet --, therefor.

In Column 7, Line 42, delete "initialing" and insert -- initially --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*